United States Patent Office 3,435,242
Patented Mar. 25, 1969

3,435,242
FORMATION INSPECTING ARRANGEMENT
Robert W. Kinne, Columbus, Ohio, assignor to Industrial
Nucleonics Corporation, a corporation of Ohio
Filed Feb. 5, 1964, Ser. No. 342,642
Int. Cl. G01n 21/30; G01l 5/04
U.S. Cl. 250—219                                    5 Claims

ABSTRACT OF THE DISCLOSURE

An apparatus for detecting the structure of material by sensing through a plurality of photodiodes, radiant energy signals being transmitted through the material. The photodiodes are placed in a concentric formation, wherein the narrow beam photodiode is in close proximity to the material being tested and the plurality of wide beam energy detectors are removed at a further distance from the material relative to the narrow beam detector. The signals from these plurality of detectors are transmitted to an instantaneous ratio computer, the output of which is a signal representing the structural formation of material.

---

Figure 1:
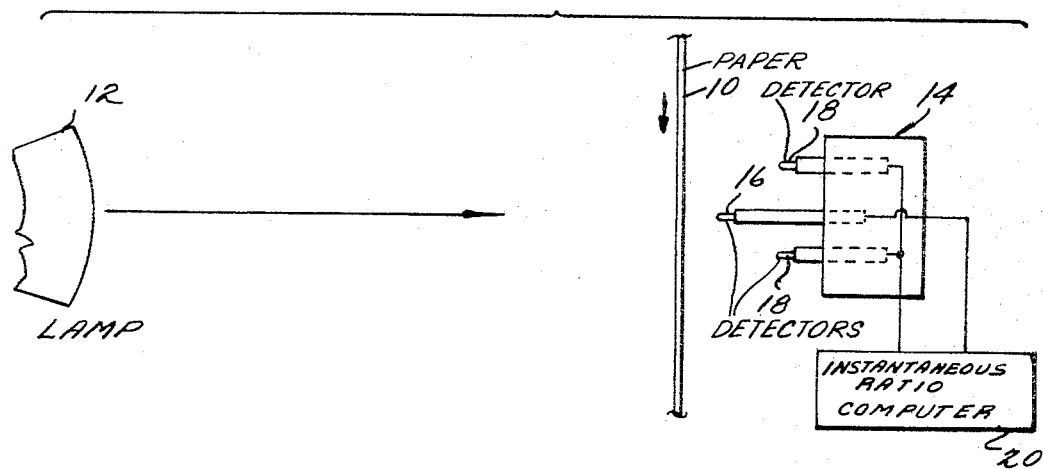

This invention relates to inspecting material as to its structure, and more particularly to determining the uniformity of the variations in the distribution of randomly oriented elements in material, for example the arrangement of fibers in a sheet of paper. Hence, this invention relates to gauging the "formation" of paper or other materials which will transmit radiation signals indicative of structural characteristics thereof.

For an introduction to this general type of gauging, reference may be made to the Burkhard et al. article "A Formation Tester Which Graphically Records Paper Structure," which appeared in the June 1960 issue of Pulp and Paper Magazine of Canada, beginning at page T–319. There, it is indicated that when a sheet of paper looks uniform on viewing it up to the light, its formation is called good, while an irregular, grainy or blotchy structure may be described as such or may be called "wild" formation.

It is the foremost object of this invention to provide improved apparatus for determining the structural variations in material, such as the formation of paper.

By this invention, an electronic measurement is made of the variation in the percent transmittance of light through paper being tested, with means being provided to effect an output corresponding to the formation of the paper.

It has been suggested in the past that the ratio of the AC to the DC component of transmitted light, expressed as a percentage, be taken as indicative of the formation wildness: see page 1278 of Pulp and Paper, Volume III, Second Edition, by Casey; Williams Patent 2,844,068; and the C. J. Moen Papers "A Formation Standard," TAPPI, April 1958, Volume 41, No. 4, pages 212A–213A, and "Theory of Differential Sensing," starting at page 34 of the Technical Section, TAPPI, January 1963, Volume 46, No. 1. In these disclosures, and also in the Eastwood Paper published in the last mentioned TAPPI beginning at page 32 and entitled "A Continuous Two-Spot Formation Recorder," there is the suggestion that two spots of light be employed to measure formation of paper. However, these spots of light are of equal size and the differences between the signals attained therefrom do not present an accurate indication of paper formation, because they do not take into account a large background area.

It is therefore an object of the persent invention to provide a formation determining apparatus which does take into account a large background area, by operating in a manner similar to the human eye when it observes the structure of paper having light passing through it. It has been found that the eye sees the variation in the present transmittance of light through the sheet of paper. In effect, the eye compares the light coming through any one small spot with the average of the transmitted light from the vicinity of that spot, for example from a relatively large area surrounding the small spot area.

In accordance with the present invention, which is based on the above discovery of the workings of the eye in evaluating paper as to its formation, this invention compares the transmittance from a small spot of light on the paper with that of a much larger area of light on the paper.

The basic invention of comparing, as by taking the instantaneous ratio of, relatively narrow and wide beam energy signals transmitted from the material whose structure is being inspected, is fully described and claimed in the co-pending Brunton application, Ser. No. 335,030, filed Jan. 2, 1964. The specific embodiment described in detail therein suggests that two photomultipliers be directed toward respective large and small areas on the moving transilluminated paper or material to be inspected, the areas preferably being of an overlapped nature such that the larger surrounds the smaller. The instantaneous variations sensed from the smaller spot indicate changes in structure such as the arrangement of fibers in paper, while the signal from the larger area represents the instantaneous average of the radiation signal transmitted from the associated large vicinity of the smaller spot. The two signals are compared, then, by an instantaneous ratio computer, which may take any one of a variety of forms as fully explained in that Brunton application. Since both the large and small radiation beams vary equally with changes in basis weight or thickness of the material, the ratio computation provides a signal representing the true variation in structure, i.e., formation.

In another co-pending application, Hickey et al., application Ser. No. 336,232, filed on Jan. 7, 1964, an embodiment of a narrow-wide beam detector arrangement is disclosed and claimed, both specifically thereto and generically hereto. That embodiment involves the use of a reflecting paraboloid which has at its focal point a detector for sensing the light transmitted from a large area of the paper or other material whose structure or formation is being inspected. Additionally, there is a second detector located axially and slightly closer to the paper, with a narrow collimating tube extending adjacent the material, for sensing the light from a small area of the paper.

The present invention relates to another specific embodiment of a detector arrangement, in particular an arrangement which has a narrow beam energy detector disposed in close proximity to the material being inspected to detect a small area of the light or other type radiant energy transmitted through the paper being inspected, and a wide beam energy detector comprising one or more detector elements around the narrow beam detector and far removed from the material relative thereto.

It is therefore the prime object of this invention to provide detecting equipment of the type just described. An arrangement made in accordance with the present invention is independent of the speed at which the material moves, or the intensity of the energy which transilluminates the material. The present invention has the further advantage of not requiring a relatively expensive reflecting paraboloid as in the Hickey et al. application.

Figure 2:
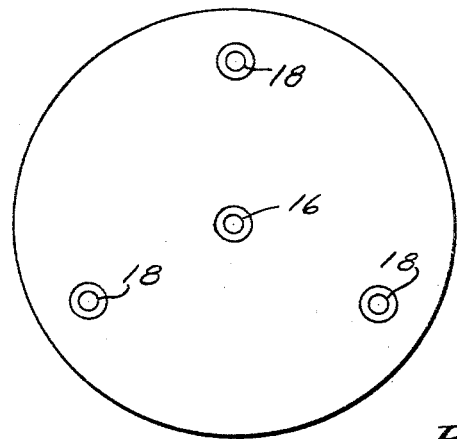

Other objects and advantages of this invention will become apparent upon reading the appended claims and the following detailed description of an embodiment of the invention, in conjunction with the drawings, in which FIGURE 1 is a diagrammatic view of an arrangement in accordance with this invention, and FIGURE 2 is a front side elevational view of the detector unit facing leftward in FIGURE 1.

In FIGURE 1 numeral 10 designates the paper or other type of material which is to be inspected or gauged as to the uniformity of its internal structure, for example, its "formation." The material being inspected transmits radiant energy, that is the paper is transilluminated by light energy from a lamp source 12. Rather than light energy itself, other forms of radiant energy may be used, such as X-rays, gamma rays, and the like. It is understood, of course, that the below mentioned light detectors would be changed, in such case, to correspond to the type of radiant energy utilized to transilluminate the material being inspected.

On the opposite side of the sheet of paper 10 is a detector unit 14 which has a central detector 16 and three outer detectors 18 (see FIGURE 2). The outer detectors 18 are disposed on a circle which is concentric with the central detector 16. While three such outer detectors 18 are illustrated, it will be apparent that more or less can be employed.

As apparent from FIGURE 1, the central detector 16 is disposed in close proximity to the paper 10, while detectors 18 are removed from the material far relative to the central detector. As an example of distances which have been successfully employed, detector 16 may be approximately 1/16 inch, while detectors 18 are approximately 5/8 inch from the paper. Preferably, the light source 12 is removed from the paper approximately 3½ to 4 feet.

This arrangement has proved its ability to read small areas, for example detector 16 can sense the transmitted light from an area of paper approximating 0.2 inch. Excellent results have been obtained insofar as intensity and speed stability are concerned.

Detectors 16 and 18 may be photodetectors of any desired type, but preferably they are photodiodes. With such diodes, the distances thereof to the material, such as the exemplary distances stated above, should be such that the narrow beam detector 16 "looks at" an effective area of 0.1 to 0.2 inch diameter, while the wide beam detectors 18 collectively sense the light from an area of 0.5 to 1.0 inch. If necessary, a lens or mirror system may be used to enlarge or reduce the beam size.

As in the aforementioned Brunton and Hickey et al. applications, the narrow and wide beam detected signals respectively represent the instantaneous variations in the structure of a small area of material and the instantaneous average of the material structure in a large area surrounding the smaller area. Formation has been described as the instantaneous ratio of those signals, and consequently, FIGURE 1 shows applying the outputs of detectors 18 in parallel to an instantaneous ratio computer 20 along with the output of detector 16. In this manner, a ratio signal may be obtained which will denote variations in formation or the like. While detector 16 may also sense variations in paper thickness or the like, detectors 18 will note the same variations and thereby cancel out any indication of such variation when the ratio between the narrow and wide beam signals is taken.

From the foregoing disclosure and discussion of the present invention, it is apparent that it provides for all of the objects and advantages herein mentioned. Still further objects and advantages, and even modifications of the invention, will become apparent to those of ordinary skill in the art upon reading this disclosure. However, it is to be understood that the disclosure is considered exemplary and not limitative, the scope of the invention being defined by the appended claims.

What is claimed is:

1. In apparatus for inspecting material as to its formation structure by making a comparison of detected narrow and wide radiant energy signals transmitted from the material, the improvement comprising:
    means for causing said radiant energy to be transmitted by said material,
    a narrow beam energy detector in close proximity to said material, and
    a wide beam energy detector laterally spaced from said narrow beam detector and removed from said material far relative to said narrow beam detector.

2. Apparatus as in claim 1 including a plurality of said wide beam detectors disposed in a circle concentric with said narrow beam detector.

3. In apparatus for gauging formation of paper during the relative movement thereof with said apparatus, the improvement comprising:
    means for transilluminating said paper with light rays,
    a narrow beam light detector disposed in close proximity to said paper to receive therefrom a transmitted beam of light varying with regard to formation and other characteristics,
    a plurality of wide beam light detectors disposed much further from said sheet than said narrow beam detector and concentrically thereof so as to receive the instantaneous average of the transmitted light surrounding the narrow beam, and
    means for comparing the outputs of said detectors to provide a signal independent of all said characteristics except formation.

4. In apparatus for inspecting material as to its formation structure by making a comparison of detected narrow and wide radiant energy signals transmitted through the material, the improvement comprising:
    means for causing said radiant energy to be transmitted through said material,
    a narrow beam energy detector disposed in close proximity to said material to detect a small area of the said transmitted energy, and
    a wide beam energy detector comprising a plurality of detector elements around said narrow beam detector and far removed from said material relative thereto.

5. In an apparatus for gauging formation of paper during the relative movement thereof with said apparatus, the improvement comprising:
    means for transilluminating said paper with light rays,
    a narrow beam light detector disposed in proximity to said paper to receive therefrom a transmitted beam of light varying with regard to formation and other characteristics,
    a wide beam light detector including a plurality of light detecting elements disposed much further from said sheet than said narrow beam detector and concentrically thereof so as to receive the instantaneous average of the transmitted light surrounding the narrow beam, and
    means for comparing the outputs of said detectors to provide a signal independent of all said characteristics except formation.

References Cited

UNITED STATES PATENTS

| 2,843,756 | 7/1958 | Wise et al. | 250—210 |
| 3,114,791 | 12/1963 | Zabel et al. | 250—219 |
| 3,132,254 | 5/1964 | Woodward | 250—219 |
| 3,134,021 | 5/1964 | Ploke | 88—23 |
| 3,212,394 | 10/1965 | Norwood | 250—214 |
| 3,228,282 | 1/1966 | Barker | 250—219 |

WALTER STOLWEIN, Primary Examiner.

U.S. Cl. X.R.

73—159